United States Patent
Boyle et al.

(10) Patent No.: US 7,580,727 B2
(45) Date of Patent: Aug. 25, 2009

(54) HIGH FREQUENCY MODULE

(75) Inventors: Kevin R. Boyle, Horsham (GB);
Antonius J. M. De Graauw, Haelen (NL); Robert F. Milsom, Redhill (GB)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 10/523,429

(22) PCT Filed: Jul. 22, 2003

(86) PCT No.: PCT/IB03/03197

§ 371 (c)(1),
(2), (4) Date: Jan. 28, 2005

(87) PCT Pub. No.: WO2004/015581

PCT Pub. Date: Feb. 19, 2004

(65) Prior Publication Data

US 2005/0245283 A1  Nov. 3, 2005

(30) Foreign Application Priority Data

Aug. 2, 2002   (GB) ................................ 0217932.3

(51) Int. Cl.
    *H04M 1/00*  (2006.01)
(52) U.S. Cl. ................................... 455/552.1; 455/168.1
(58) Field of Classification Search ............. 455/552.1, 455/78, 127.1, 127.2, 127.3, 133, 127.4, 455/132, 135, 103, 140, 226.1, 150.1, 139, 455/188.1, 168.1, 205; 333/193, 133; 375/322, 375/329
See application file for complete search history.

(56) References Cited

U.S. PATENT DOCUMENTS

| | | | |
|---|---|---|---|
| 6,525,624 B1* | 2/2003 | Hikita et al. | 333/133 |
| 6,728,517 B2* | 4/2004 | Sugar et al. | 455/552.1 |
| 6,751,470 B1* | 6/2004 | Ella et al. | 455/188.1 |
| 2004/1003270 * | 2/2004 | Kemmochi et al. | 361/306.3 |
| 2005/0048927 A1* | 3/2005 | Kemmochi et al. | 455/78 |
| 2005/0245201 A1* | 11/2005 | Ella et al. | 455/78 |

FOREIGN PATENT DOCUMENTS

WO   WO0237709 A1   5/2002

* cited by examiner

*Primary Examiner*—Quochien B Vuong

(57) ABSTRACT

A multi-mode radio module (22) comprises a terminal (11) for connection to an antenna (10). A transmitting branch (DCS/PCS) and a branching circuit are coupled to the terminal (11). The branching circuit comprises at least a first and a second branch for receiving signals in first and second frequency bands (DCS, PCS), respectively. Each of the first and second branches comprise, respectively, a phase shifting circuit (PS1, PS2), a BAW or SAW band pass filter (RXF2, RXF3) coupled to the phase shifting circuit, the bandwidth of the filter being selected to pass a wanted signal in one of the first and second frequency bands but reject an unwanted signal in the other of the second and first frequency bands, and a low noise amplifier (LNA2, LNA3) coupled to an output of the band pass filter. The response of each of the band pass filters (RXF2, RXF3) is phase shifted to present an open circuit at the wanted frequency in the other branch. Each of the phase shifting circuits (PS1, PS2) is impedance transforming so that higher impedance filters can be used.

18 Claims, 2 Drawing Sheets

HIGH FREQUENCY MODULE

The present invention relates to a high frequency module having particular, but not exclusive, application in a multi-mode radios used for example in cellular telephones.

A multi-mode radio used in cellular telephones may have the capability to operate in accordance with several different standards/frequency bands, such as GSM, DCS (Digital Cellular System 1800) and PCS (Personal Digital Cellular). Since such radios have one antenna to which is coupled several transmitter/receiver front ends, it is necessary to be able to select one front end in preference to the others. Typically band pass filters and high frequency mode switches, for example PIN diodes, are used for selecting one front end from the several available. Such switches are lossy and require a discrete amount of PCB (Printed Circuit Board) space.

Figure 1:
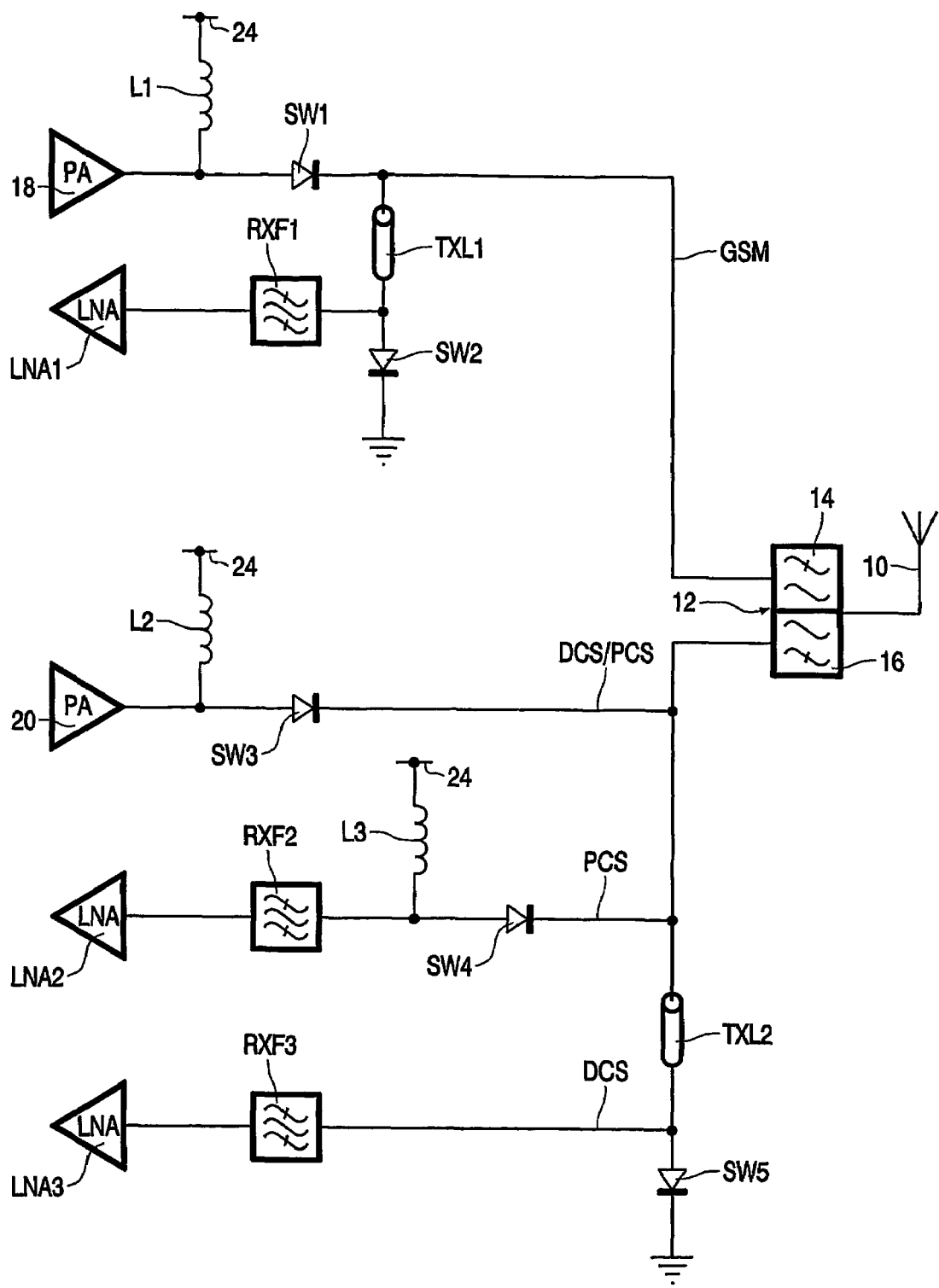

An example of such a circuit is shown in FIG. 1 of the accompanying drawings. In this circuit five mode switches SW1 to SW5 comprise PIN diodes. The illustrated circuit relates to an architecture for receiving/transmitting signals complying with the GSM, DCS and PCS standards. An antenna 10 is coupled to a duplexer filter 12 which comprises a low pass filter 14 for passing GSM frequencies but blocking DCS and PCS frequencies and a high pass filter 16 for passing DCS and PCS frequencies and blocking GSM frequencies.

The GSM RF front end architecture comprises a power amplifier 18 having an output coupled to a first mode switch SW1 and by an inductance L1 to a power supply line 24. The mode switch SW1 is coupled to the low pass filter 14 and to one end of a transmission line TXL1. The other end of the transmission line TXL1 is coupled to a mode switch SW2 and to an input of a receiver SAW band pass filter RXF1. An output of the band pass filter RXF1 is coupled to an input of a low noise amplifier LNA1.

The DCS and PCS RF front ends are coupled to the high pass filter 16. A common DCS/PCS transmitter comprises a power amplifier 20 having an output coupled to a mode switch SW3 and by way of an inductance L2 to a power supply line 24. The cathode of the mode switch SW3 is coupled to the filter 16. The front ends of the DCS and PCS receivers are separate. An output of the filter 16 is coupled to a mode switch SW4 and to one end of a length of transmission line TXL2. The mode switch SW4 is coupled to one side of a PCS receiver SAW filter and to an inductance L3 which is coupled to the power supply line 24. An output of the SAW filter RXF2 is coupled to the PCS low noise amplifier LNA2. The other end of the length of transmission line TXL2 is coupled to a mode switch SW5 and to a DCS receiver SAW filter RXF3. An output of the SAW filter RXF3 is coupled to a DCS low noise amplifier LNA3.

All the filters have an input impedance of 50 Ω whereas the input impedance of low noise amplifiers is typically 200 Ω. Matching of the different impedances may be achieved by the filters or by impedance transformation between the filter and its respective low noise amplifier. A particular disadvantage of this architecture is that a relatively high current, typically of the order of 1 mA is consumed by the mode switch SW4 in the PCS listening/standby mode, thereby lowering battery life. Ideally there should not be any current drain in the listening/standby mode.

European Patent Specification EP 1 168 650 A1 discloses a high frequency switch module for switching between a DCS/PCS transmitter and a DCS receiver and a PCs receiver. An antenna is coupled to a duplexer comprising a low pass filter coupled to a GSM circuit and a high pass filter coupled by way of a change-over switch to a DCS/PCS transmitter front end and to a branching circuit having branches for a DCS receiver front end and a PCS receiver front end, respectively. Each of the branches respectively comprises a phase shifter coupled to the input of a DCS or PCS filter, as appropriate. Each phase shifter is constituted by a transmission line having an actual length of about λ/10 to λ/4 at a respective frequency of interest. Viewed from the common terminal the impedance characteristics of the respective branches are that they are substantially open state in a reception band of the other branch. Whilst this cited module has fewer mode switches compared to FIG. 1, the use of transmission line as phase shifters is subject to undesired losses and it is necessary to provide an impedance transformer between the respective filter and low noise amplifier input. Additionally the open state impedance presented by the blocking branch is such that not all the signal goes to the other branch.

An object of the present invention is to produce a multi-mode radio module which will operate more effectively than the cited module.

According to one aspect of the present invention there is provided a multi-mode radio module comprising a terminal for connection to signal propagating and receiving means, a transmitting branch coupled to the terminal, and a branching circuit coupled to the terminal, the branching circuit comprising at least a first and a second branch for receiving signals in first and second frequency bands, respectively, each of the first and second branches comprising, respectively, a phase shifting circuit, a band pass filter coupled to the phase shifting circuit, the bandwidth of the filter being selected to pass a wanted signal in one of the first and second frequency bands but reject an unwanted signal in the other of the second and first frequency bands, and a low noise amplifier coupled to an output of the band pass filter, wherein each of the phase shifting circuits is impedance transforming.

According to another aspect of the present invention there is provided a multi-mode radio comprising signal propagating and receiving means, means for modulating signals to be transmitted, means for demodulating received signals and a multi-mode radio module comprising a transmitting branch coupled to the signal propagating and receiving means, the modulating means being coupled to a signal input of the transmitting branch, and a branching circuit coupled to the signal propagating and receiving means, the branching circuit comprising at least a first and a second branch for receiving signals in first and second frequency bands, respectively, each of the first and second branches comprising, respectively, a phase shifting circuit, a band pass filter coupled to the phase shifting circuit, the bandwidth of the filter being selected to pass a wanted signal in one of the first and second frequency bands but reject an unwanted signal in the other of the second and first frequency bands, and a low noise amplifier coupled to an output of the band pass filter, the respective low noise amplifiers being coupled to the demodulating means, wherein each of the phase shifting circuits is impedance transforming.

By making the phase shifting circuits upwardly impedance transforming the respective receiver front end has a more efficient configuration. The beneficial features of impedance transforming are that the impedance can be transformed from the antenna impedance of 50 Ω to the input impedance of the low noise amplifier, typically 200 Ω, thereby avoiding the need to provide a separate impedance matching stage between the output of the filter and the low noise amplifier or having to make the filter impedance transforming. Also the phase shifting circuits present a significantly better open state, compared to the cited circuit, which means that more signal goes to the wanted branch. Further the filter when fabricated as a Bulk Acoustic Wave (BAW) filter or Surface Acoustic Wave filter will require approximately a quarter of the area of a PCB and have fewer losses compared to a BAW or SAW having an input impedance of 50 Ω.

Figure 2:
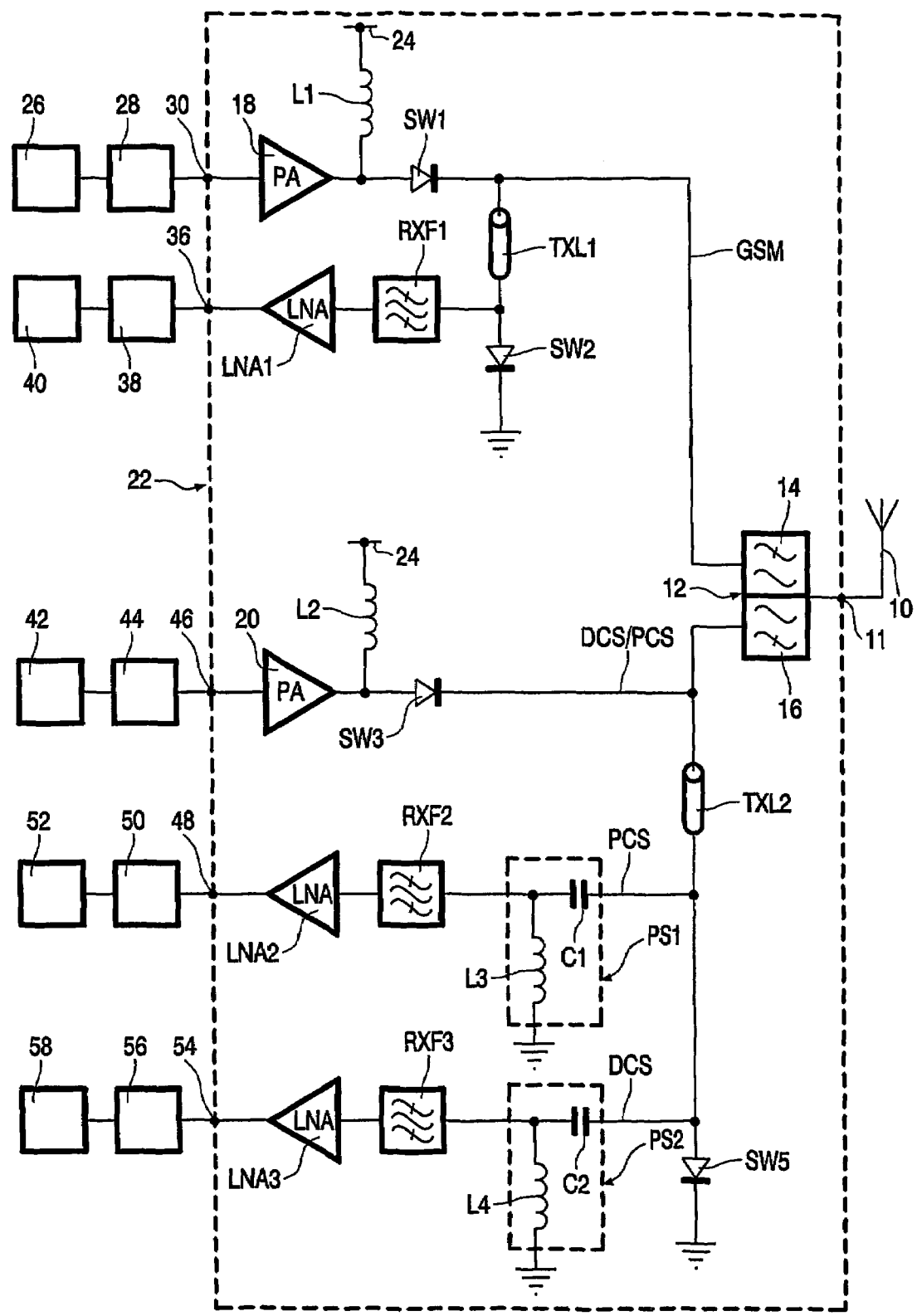

The present invention will now be described, by way of example, with reference to the accompanying drawings, wherein:

FIG. 1 is a block schematic circuit diagram of a multi-mode radio module having a plurality of mode switches, and FIG. 2 is a block schematic diagram of a multi-mode radio/radio module made in accordance with the present invention.

In the drawings the same reference numerals have been used to identify corresponding features.

In the interests of brevity as FIG. 1 has been described already in the preamble of this specification it will not be described again.

The multi-mode radio shown in FIG. 2 is intended for receiving/transmitting signals complying with the GSM, DCS and PCS standards. An antenna 10 is coupled to a terminal 11 of a multi-mode radio module 22. The terminal is coupled to a duplexer filter 12 which comprises a low pass filter 14 for passing GSM frequencies but blocking DCS and PCS frequencies and a high pass filter 16 for passing DCS and PCS frequencies and blocking GSM frequencies.

The GSM RF front end architecture comprises a power amplifier 18 having an output coupled to a first mode switch SW1 and by an inductance L1 to a power supply line 24. The first mode switch SW1 is coupled to the low pass filter 14 and to one end of a λ/4 transmission line TXL1. The other end of the transmission line TXL1 is coupled to a mode switch SW2 implemented as a PIN diode and to an input of a receiver SAW band pass filter RXF1. An output of the band pass filter RXF1 is coupled to an input of a low noise amplifier LNA1.

A signal source 26 is coupled to a GSM modulator 28 having an output coupled to a terminal 30 which is coupled to the power amplifier 18. A received GSM signal provided by the low noise amplifier LNA1 is supplied to a demodulator 38 by way of a terminal 36. An output of the demodulator 38 is supplied to an output device 40, such as an acoustic transducer.

The DCS and PCS RF front ends are coupled to the high pass filter 16 of the duplexer 12. A common DCS/PCS transmitter comprises a signal source 42 coupled to an input of a DCS/PCS modulator 44 which is coupled by way of a terminal 46 to a power amplifier 20 having an output coupled to a mode switch SW3 implemented as a PIN diode and by way of an inductance L2 to the power supply line 24. The cathode of the mode switch SW3 is coupled to the filter 16.

The RF front ends of the DCS and PCS receivers form separate branches of a branching circuit which is connected by way of a λ/4 transmission line TXL2 to the filter 16. The transmission line TXL2 presents an open circuit and avoids loading the DCS/PCS transmitter. The PCS branch comprises an impedance transforming phase shifting circuit PSI consisting of a series capacitor C1 and a shunt inductance L3. An output of the phase shifting circuit PS1 is connected to a band pass filter RXF2 which may be a BAW or SAW filter. The filter RXF2 is coupled to the PCS low noise amplifier LNA2. The low noise amplifier LNA2 is coupled by way of a terminal 48 to a PCS demodulator 50 to which a suitable output stage 52 is connected.

The DCS branch comprises an impedance transforming phase shifting circuit PS2 consisting of a series capacitor C2 and a shunt inductance L4. An output of the phase shifting circuit PS2 is connected to a band pass filter RXF3 which may be a BAW or SAW filter. The filter RXF3 is coupled to the DCS low noise amplifier LNA3. The low noise amplifier LNA3 is coupled by way of a terminal 54 to a DCS demodulator 56 to which a suitable output stage 58 is connected.

The other end of the length of transmission line TXL2 is coupled to a mode switch SW5 implemented as a PIN diode.

Ignoring the GSM part of the module, when the DCS/PCS transmitter branch wants to transmit the mode switches SW3 and SW5 are conductive so that the voltage on the power supply line 24 is coupled to the DCS/PCS transmitter. No current is drawn by the DCS and PCS receiver branches because they are isolated by the conduction of the mode switch SW5. In the receive mode the mode switches SW3 and SW5 are non-conductive so that a received signal is applied to both branches of the branching circuit by way of the transmission line TXL2. The two RF receive front ends can be connected together without the necessity of a mode switch, such as the mode switch SW4 in FIG. 1, by making use of the out-of-band responses of the band pass filters RXF2 and RXF3 and by phase shifting the response of each of these filters so that they appear as an open circuit at the frequency of the other band. Consequently in the listening state the PCS receiver is not causing current to be drained. The phase shifts produced by the phase shifting circuits PS1 and PS2 are made impedance transforming so that their input impedance is 50Ω to match that of the transmission line TXL2 and their output impedance is 200Ω to match the input impedance of the respective band pass filter RXF2, RXF3. It is inherently better to impedance transform before the respective filter RXF2, RXF3 since these filters are electrically long. Since the output impedance of the impedance transforming circuit is relatively high it enables these filters to be made of physically smaller resonators compared to an architecture with non impedance transforming phase shifting circuits. This means, in the case of BAW filters, that the area scales down by a factor equal to the impedance increase. This is also true of SAW filters, although there is rather less flexibility, since only one dimension can be used. Thus, a factor of 4 means that a saving of the order of 75% of the area of a printed circuit board can be made (excluding the interconnect area). The upward impedance transformation is effected by increasing the values of the shunt inductances L3, L4 and altering the values of the capacitors C1, C2. Another feature is that the band pass filters exhibit lower losses in the chosen architecture and a better match to typical low noise amplifier impedances thereby avoiding the need for separate impedance matching after the filter stages. The reason for this is that the lossy parasitic capacitance scales with device size, that is, loss remains unchanged at different filter impedance values. The series resistance, however, remains the same. Thus, the series losses reduce as the filter impedance increases. With SAW devices it is likely that the series resistance would reduce as the filter impedance is increased. This will reduce losses further.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use multi-mode radios/modules and component parts therefore and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A multi-mode radio module comprising:
   a terminal for connection to signal propagating and receiving means,
   a transmitting branch coupled to the terminal, and
   a branching circuit coupled to the terminal, the branching circuit comprising at least a first and a second branch for receiving signals in first and second frequency bands, respectively, each of the first and second branches comprising:
      a phase shifting circuit, wherein the phase shifting circuit has an input terminal and an output terminal, the input terminal of the phase shifting circuit being coupled to the terminal,
      a band pass filter coupled to the output terminal of the phase shifting circuit, the bandwidth of the filter being selected to pass a wanted signal in one of the first and second frequency bands but reject an unwanted signal in the other of the second and first frequency bands, and
      a low noise amplifier coupled to an output of the band pass filter,
      wherein the phase shifting circuit has input impedance and output impedance, the input impedance being smaller than the output impedance, the input impedance being applied to the terminal through the input terminal of the phase shifting circuit, the output impedance being applied to the band pass filter through the output terminal of the phase shifting circuit.

2. A radio module as claimed in claim 1, wherein each of the band pass filters is a Bulk Acoustic Wave filter.

3. A radio module as claimed in claim 1, wherein each of the band pass filters is a Surface Acoustic Wave filter.

4. A radio module as claimed in claim 1, wherein each of the phase shifting circuit, comprises a series capacitance and a shunt inductance, the values of the series capacitance and the shunt inductance being such as to provide a predetermined impedance transformation between that of the signal propagating and receiving means and the respective band pass filter.

5. A radio module as claimed in claim 1, wherein the branching circuit is coupled to the terminal by way of a length of transmission line.

6. A radio module as claimed in claim 5, wherein the transmitting branch has a series switch coup led to the terminal and the branching circuit has a shunt switch coupled to an end of the transmission line remote from the terminal.

7. A radio module as claimed in claim 1, wherein a duplexer is coupled to the terminal, in that the transmitting and the branching circuit are coupled to a port of the duplexer for passing signals having frequencies lying in a first bandwidth and in that a further port is coupled to a further branch for processing signals having frequencies lying in a second bandwidth.

8. A radio module as claimed in claim 1, wherein the branching circuit is coupled to the terminal through a transmission line, the input impedance of each of the phase shifting circuits being matched to impedance of the transmission line, the output impedance of each of the phase shifting circuits being matched to impedance of a band pass filter, the band pass filter and the phase shifting being in the same branch.

9. A radio module as claimed in claim 8, wherein the input impedance of each of the phase shifting circuits is 50 Ω.

10. A radio module as claimed in claim 8, wherein the transmission line is a quarter wavelength transmission line.

11. A radio module as claimed in claim 1, wherein the branching circuit has a PIN diode, the anode of the PIN diode being coupled to one end of a transmission line, the other end of the transmission line being coupled to the terminal.

12. A multi-mode radio comprising:
    signal propagating and receiving means,
    means for modulating signals to be transmitted,
    means for demodulating received signals and
    a multi-mode radio module, wherein the multi-mode radio module comprises:
       a transmitting branch coupled to the signal propagating and receiving means, the modulating means being coupled to a signal input of the transmitting branch, and
       a branching circuit coupled to the signal propagating and receiving means, the branching circuit comprising at least a first and a second branch for receiving signals in first and second frequency bands, respectively, each of the first and second branches comprising:
          a phase shifting circuit, wherein the phase shifting circuit has an input terminal and an output terminal, the input terminal of the phase shifting circuit being coupled to the terminal,
          a band pass filter coupled to the output terminal of the phase shifting circuit, the bandwidth of the filter being selected to pass a wanted signal in one of the first and second frequency bands but reject an unwanted signal in the other of the second and first frequency bands, and
          a low noise amplifier coupled to an output of the band pass filter, the respective low noise amplifiers being coupled to the demodulating means,
       wherein the phase shifting circuit has input impedance and output impedance, the input impedance being smaller than the output impedance, the input impedance being applied to the terminal through the input terminal of the phase shifting circuit, the output impedance being applied to the band pass filter through the output terminal of the phase shifting circuit.

13. A radio as claimed in claim 12, wherein each of the phase shifting circuits comprises a series capacitance and a shunt inductance, the value of the series capacitor and the shunt inductance being such as to provide a predetermined impedance transformation between that of the signal propagating and receiving means and the respective band pass filter.

14. A radio as claimed in claim 13, wherein the transmitting branch has a series switch coupled to the terminal and the branching circuit has a shunt switch coupled to one end of a quaffer wavelength transmission line, the other end of the transmission line being coupled to the terminal.

15. A radio as claimed in claim 12, wherein a duplexer is coupled to the terminal, in that the transmitting and the branching circuit are coupled to a port of the duplexer for passing signals having frequencies lying in a first bandwidth and in that a further port is coupled to a further branch for processing signals having frequencies lying in a second bandwidth.

16. A radio as claimed in claim 12, wherein the branching circuit is coupled to the terminal through a transmission line, the input impedance of each of the phase shifting circuits being matched to impedance of the transmission line, the output impedance of each of the phase shifting circuits being matched to impedance of a band pass filter, the band pass filter and the phase shifting being in the same branch.

17. A radio as claimed in claim 16, wherein the input impedance of each of the phase shifting circuits is 50 Ω.

18. A radio as claimed in claim 12, wherein the branching circuit has a PIN diode, the anode of the PIN diode being coupled to one end of a transmission line, the other end of the transmission line being coupled to the terminal.

* * * * *